United States Patent [19]

Fukui et al.

[11] Patent Number: 5,012,779
[45] Date of Patent: May 7, 1991

[54] ENGINE ROTATION CONTROL DEVICE

[75] Inventors: Wataru Fukui; Toshio Iwata, both of Himeji, Japan

[73] Assignee: Mitsubishi Denki K.K., Tokyo, Japan

[21] Appl. No.: 510,759

[22] Filed: Apr. 18, 1990

[30] Foreign Application Priority Data

Apr. 19, 1989 [JP] Japan .................................. 1-97641
Apr. 27, 1989 [JP] Japan ................................. 1-105950

[51] Int. Cl.$^5$ .............................................. F02D 41/16
[52] U.S. Cl. ..................................................... 123/339
[58] Field of Search .......................................... 123/339

[56] References Cited

U.S. PATENT DOCUMENTS

| | | | |
|---|---|---|---|
| 4,365,599 | 12/1982 | Ikeura | 123/339 |
| 4,446,832 | 5/1984 | Matsumura et al. | 123/339 |
| 4,461,253 | 7/1984 | Kobashi et al. | 123/339 |
| 4,513,710 | 4/1985 | Kobayashi et al. | 123/339 |
| 4,552,109 | 11/1985 | Baccadoro et al. | 123/339 |
| 4,697,563 | 10/1987 | Becker et al. | 123/421 |
| 4,781,161 | 11/1988 | Sausner et al. | 123/339 |

*Primary Examiner*—Tony M. Argenbright
*Attorney, Agent, or Firm*—Sughrue, Mion, Zinn, Macpeak & Seas

[57] ABSTRACT

An engine control device for controlling the number of revolutions per minute of an engine to be at a prescribed target value in a precise manner during the idling operation thereof. A signal generator generates an output signal representative of the crank angle of the engine in synchrony with the rotation thereof. In one aspect, the number of revolutions per minute of the engine is successively calculated based on the signal generator output. A present average number of revolutions per minute of the engine is calculated and updated every ignition instant. A deviation of the present average number of rpm from the predetermined target value is calculated from the present average number of rpm. The ignition timing is determined based on the deviation thus calculated in such a manner as to maintain the number of engine rpm at the target value. In another aspect, when the number of engine rpm falls into a prescribed idling operation range such as when the engine is decelerated with a clutch disengaged, the operation of the controller for maintaining the number of rpm at the target value is delayed a predetermined time so that a sharp change or an excessive decrease below the target value in the number or rpm can be avoided.

9 Claims, 4 Drawing Sheets

ENGINE ROTATION CONTROL DEVICE

BACKGROUND OF THE INVENTION

This invention relates to an engine rotation control device for controlling the idling speed of an engine.

In order to control operating conditions of an engine such as ignition timing, fuel injection and the like, signals are generally utilized which are generated by a signal generator in synchrony with the rotation of the engine. The signal generator generally senses the rotation of a crankshaft or camshaft operatively coupled therewith. An example of this type of signal generator is schematically illustrated in FIGS. 1 and 2. In FIG. 1, a signal generator in the form of a rotational position sensor is generally designated by referrence numeral 8 and includes a rotating shaft 1 which is rotated in synchrony with the rotation of a multicylinder engine (not shown) which is, in this example, a four-cylinder engine, and a rotary disk 2 secured at its center to the rotating shaft 1 for integral rotation therewith. The rotatry disk 2 has a plurality of windows or slits 3 formed therein around the rotating shaft 1 in a circumferentially spaced relation with respect to each other. Each of the slits 3 corresponds to one of the cylinders of the engine, so for a four-cylinder engine, there are four slits in the disk 2. The slits 3 are equally distant from the center of the rotary disk 2. All the slits 3 have the same length as one another in the circumferential direction of the disk 2. Each of the slits 3 has a leading edge L and a trailing edge T. The leading edges L and the trailing edges T of all four slits 3 are equally spaced around the disk 2 at intervals of 90 degrees.

As shown in FIGS. 1 and 2, a light source 4 in the form of light emitting diode and a light sensor in the form of a phototransistor 5 are disposed in alignment with each other on opposite sides of the rotary disk 2 in such a manner that when one of the slits 3 is aligned with the light emitting diode 4 and the phototransistor 5, light emitted from the light emitting diode 4 can pass through the slot 3 thus aligned and reach the phototransistor 5, which is thereby turned on. At other times, the phototransistor 5 remains off.

In operation, when the light which is generated by the light emitting diode 4 passes through one of the slits 3 in the disk 2 and strikes the phototransistor 5, the phototransistor 5 conducts and current flows through the phototransistor 5 and a resistor 5A which is connected to the emitter of the phototransistor 5. An amplifier 6 amplifies the voltage across the resistor 5A and provides the amplified signal to the base of an open-collector output transistor 7.

FIG. 3 illustrates the output signal of the signal generator 8. The output signal is in the form of pulses having a rising edge corresponding to the leading edge L and a falling edge corresponding to the trailing edge T of each slit 3 in the disk 2. In FIG. 3, a rising edge of an output pulse occurs when the piston position of the corresponding cylinder is at 75° before top dead center (BTDC) whereas the falling edge occurs when the piston position of the corresponding cylinder is at 5° BTDC However, the piston positions corresponding to the rising and falling edges in FIG. 3 are just examples, and different values can be employed.

As shown in FIG. 4 the output signal of the signal generator 8 is inputted to a microcomputer 10 via an interface 9. Based on the output signal from the signal generator 8, the microcomputer 10 controls the ignition timing, the fuel injection, and other aspects of engine operation. For example, in order to stabilize the number of revolutions per minute of the engine, the microcomputer 10 successively determines the intantaneous number of revolutions per minute (rpm) of the engine, for example, by measuring the length of time between the rising or falling edges of two successive pulses of the generator output signal, calculates an average value of the thus determined instantaneous numbers of rpm for a predetermined number of ingitions, compares each instantaneous number of rpm with the corresponding average value so as to obtain a deviation therefrom, and then sends a control signal to make a certain appropriate adjustment or modification of the ignition timing in dependence upon the deviation thus obtained.

With the known engine control device as constructed above, it is possible to reduce instantaneous pulsations or fluctuations in the number of engine rpm, but it is difficult to maintain the number of engine rpm at a prescribed target value. This is because an average value of instantaneous numbers of rpm caluated for a predetermined number of ignitions is fixed and does not always take account of the latest number of rpm most recently sensed or calculated.

Further, the above-described known device involves another problem. Specifically, an adjustment range of engine operation in which appropriate adjustments or modifications in ignition timing are to be made are generally determined based on a threshold value of rpm (e.g., below 1,000 rpm) which is set to be higher than a predetermined target idling number of rpm and a threshold engine load (e.g., an intake vacuum below 400 mm Hg) which is set to be greater than a predetermined target engine load. Accordingly, when the engine is decelerated with a clutch being cut off, such adjustments or modifications are carried out as soon as the operating conditions of the engine get into the adjustment range (e.g., when the number of engine rpm falls below the maximum threshold value of rpm which is greater than the target idling number of rpm). As a result, the engine will often experience an excessive fall or reduction in the number of rpm.

SUMMARY OF THE INVENTION

Accordingly, the present invention is intended to obviate the abovementioned problems encountered with the known engine control device.

An object of the present invention is to provide a novel and improved engine control device which is able to control the number of revolutions per minute of an engine during idling to be at a prescribed target value in a precise manner.

A specific object of the invention is to more precisely calculate a deviation of the instant or present average number of rpm from a target idling number of rpm reflecting a change between the present number of rpm and the preceding number of rpm so as to control the number of engine rpm during idling based on the deviation thus calculated.

Another object of the present invention is to provide a novel and improved engine control device which is able to control the number of revolutions per minute of the engine during idling to be at a prescribed target value in a stable manner irrespective of any transient operating conditions of the engine.

A more specific object of the invention is to prevent an excessive fall or reduction in the number of rpm when the number of engine rpm falls into a prescribed idle control range such as when the engine is decelerated with a clutch disengaged.

According to one aspect of the present invention, there is provided an engine control device for controlling the number of revolutions per minute of an engine to be at a prescribed target value during idling operation thereof. The engine control device includes:

a signal generator for generating an output signal representative of the crank anglee of the engine in synchrony with the rotation thereof, a rotational number determining means for receiving the output signal of the signal generator and determining the number of revolutions per minute of the engine based on the signal generator output in a successive manner; and an ignition timing controlling means for controlling ignition timing in dependence upon various operating conditions of the engine, the ignition timing controlling means being operable to calculate a present average number of revolutions per minute of the engine which is updated every ignition instant, determine a deviation of the present average number of revolutions per minute of the engine from the predetermined target value and modify the ignition timing based on the deviation thus determined in such a manner as to maintain the number of engine rpm at the target value.

The ignition timing controlling means calculates the present average number of revolutions per minute of the engine ($N_{ave}(n)$) based on the preceding average number of revolutions per minute ($N_{ave}(n-1)$) and the present number of revolutions per minute ($N_{IDL}$) by the use of the following formula:

$$N_{AVE} = N_{AVE}(n-1) + K\{N_{AVE}(n-1) - N_{IDL}\}$$

where K is an averaging constant.

In one embodiment, the ignition timing controlling means modifies the ignition timing by a quantity of ignition timing modification ($\theta_{ISC}$) which is calculated based on the deviation of the present average number of revolutions per minute of the engine ($N_{AVE}(n)$) from the target number of revolutions per minute ($N_{TID}$) by the use of the following formula:

$$\theta_{ISC} = (N_{TID} - N_{AVE}(n)) * K_1\theta$$

where $K_1\theta$ is a conversion constant.

In another embodiment, the ignition timing controlling means modifies the ignition timing by a present quantity of ignition timing modification ($\theta_{ISC}(n)$) which is calculated based on the preceding quantity of ignition timing modification ($\theta_{ISC}(n-1)$), and the deviation of the present average number of revolutions per minute of the engine ($N_{AVE}(n)$) from the target number of revolutions per minute ($N_{TID}$) by the use of the following formula:

$$\theta_{ISC}(n) = \theta_{ISC}(n-1) + (N_{TID} - N_{AVE}(n)) * K_2\theta$$

where $K_2\theta$ is a conversion constant.

Preferably, the ignition timing controlling device presets a maximum quantity of ignition timing modification and fixes the present quantity of ignition timing modification ($\theta_{ISC}(n)$) at the maximum quantity of ignition timing modification.

The rotational number determining means and the ignition timing controlling means may be constituted by a microcomputer.

According to another aspect of the present invention, there is provided an engine control device for controlling the number of revolutions per minute of an engine to be at a prescribed target value during the idling operation thereof, the engine control device includes:

a signal generator for generating an output signal representative of the crank angle of the engine in synchrony with the rotation thereof;

a sensor means for sensing operating conditions of the engine and generating output signals representative of the sensed operating conditions;

an engine operating condition determining means for determining from the output signals of the sensor means whether the engine is idling;

a control means for controlling the number of revolutions per minute of the engine to be at the prescribed target value during the time when the engine is idling; and a delay means for delaying the controlling operation of the control means a predetermined time after the engine operating condition determining means has determined that the engine is idling.

Preferably, the control means calculates the number of revolutions per minute of the engine based on the output signal of the signal generator, and determines whether the number of revolution per minute of the engine falls within a prescribed idle control range, and approximates the number of revolutions per minute of the engine to the target value when it is determined that the number of revolutions per minute of the engine calculated falls within the prescribed idle control range.

Preferably, the prescribed idle control range is from the target value to a certain value greater than the target value.

The engine operating condition determining means, the control means and the delay means may be constituted by a microcomputer.

The above and other objects, features and advantages of the present invention will become apparent from the following detailed description of a few presently preferred embodiments thereof taken in conjuction with the accompanying drawings.

DESCRIPTION OF THE PREFERRED EMBODIMENTS

The present invention will now be described in detail with reference to a few presently preferred embodiments thereof as illustrated in the accompanying drawings.

Figure 1:
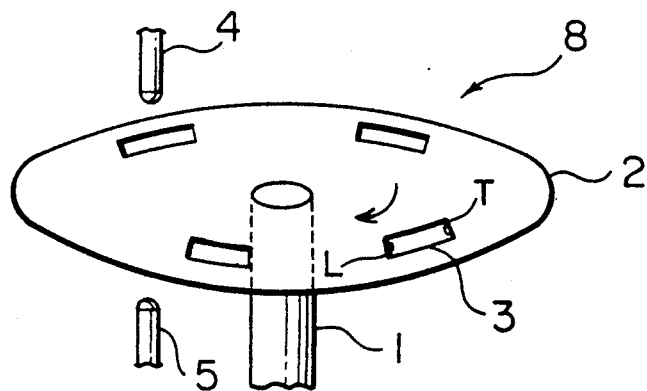
FIG. 1 is a schematic perspective view of a portion of a known signal generator.
Figure 2:
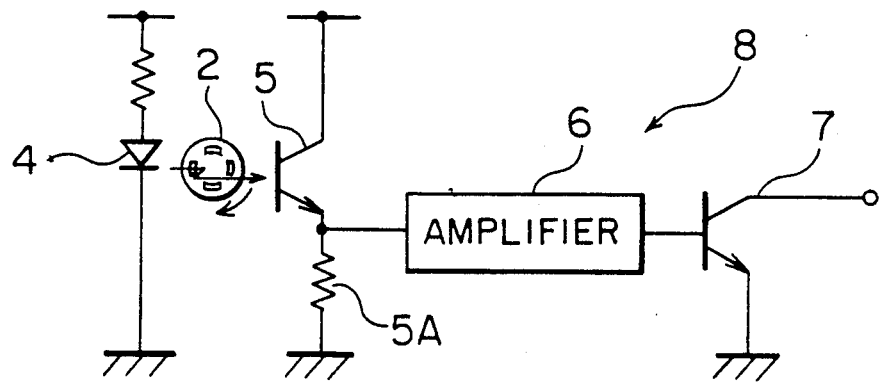
FIG. 2 is a circuit diagram of the signal generator of FIG. 1.
Figure 3:
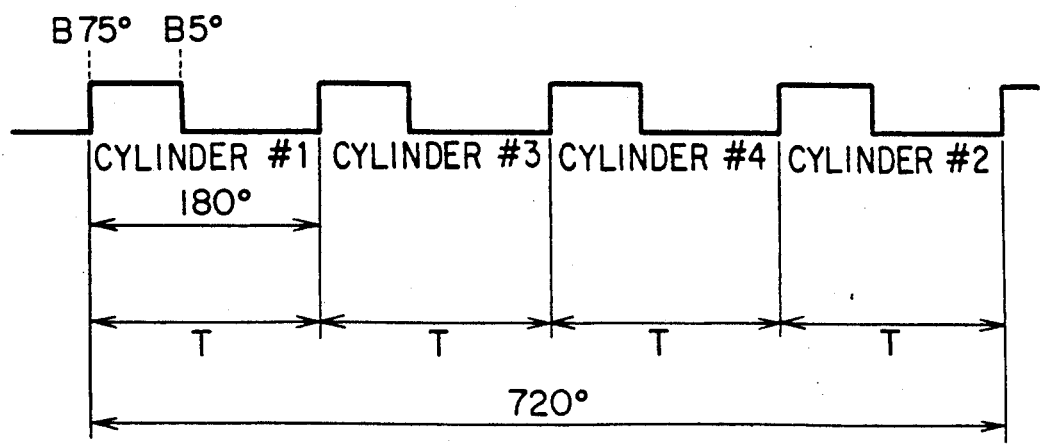
FIG. 3 is a wave form diagram of the output signal of the signal generator and a microcomputer.
Figure 4:
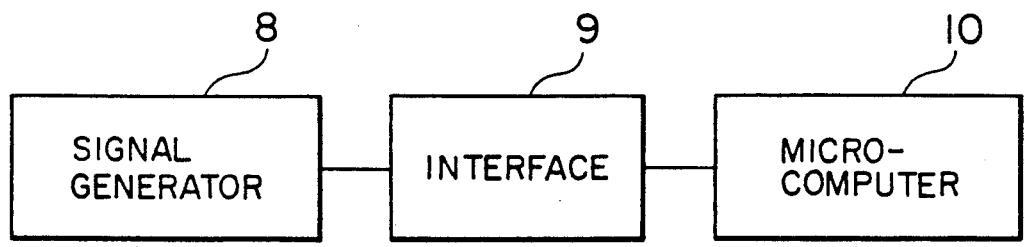
FIG. 4 is a block diagram of the connection between the signal generator and the microcomputer.
Figure 5:
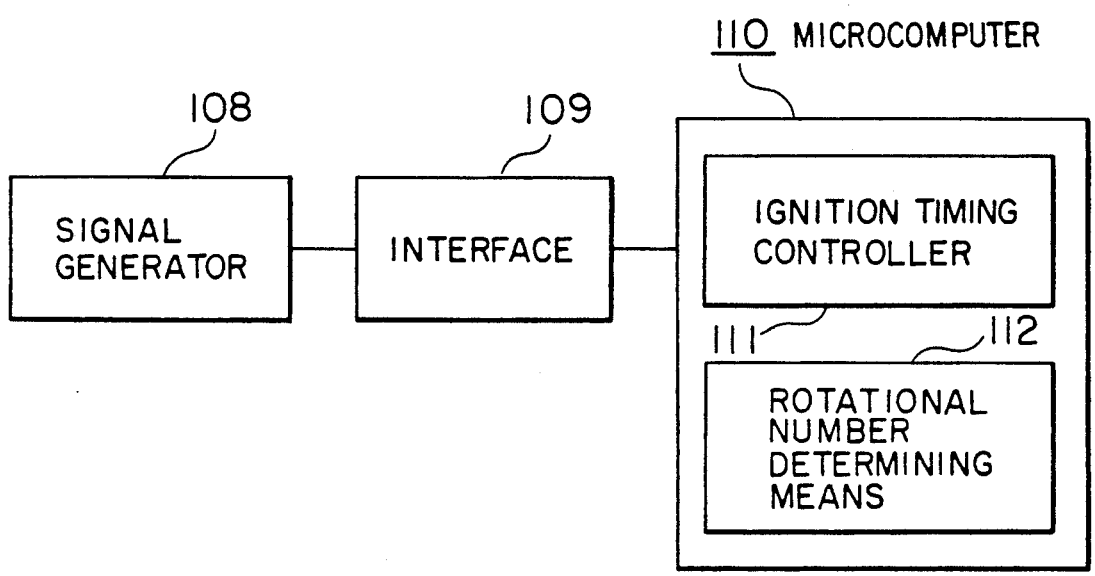
FIG. 5 is a block diagram of a first embodiment of an engine control device according to the present invention.

Referring to the drawings and first to FIG. 5, there is shown an engine control device according to a first embodiment of the present invention which includes a signal generator 108 for generating a rotational signal representative of the rotational or angular position of an engine crankshaft, an interface circuit 109 and a microcomputer 110 for controlling the various operating conditions of an engine based on the output signal of the signal generator 108 which is inputted thereto via the interface circuit 109. In this regard, the signal generator 108 and the interface circuit 109 are the same as those 8 and 9 of the previously described known device as shown in FIGS. 1 through 4. Thus, the signal generator 108 generates a rotational signal as illustrated in FIG. 3.

The microcomputer 110 comprises an ignition timing controller 111 and a rotational number determining means 112. The rotational number determining means 112 operates to successively calculate the instant or present number of revolutions per minute of the engine ($N_{IDL}$), for example, by measuring the length of time (T) between the rising or falling edges of two successive pulses (i.e., between the rising or falling edge of the present pulse and the rising or falling edge of the preceding pulse) of the output signal of the signal generator 108, as referred to before in detail with reference to FIG. 3. Based on the instant or present number of rpm ($N_{IDL}$) thus calculated, the rotational number determining means 112 then determines an instant or present average number of revolutions per minute of the engine ($N_{AVE}(n)$) using the following formula:

$$N_{AVE}(n) = N_{AVE}(n-1) + K\{N_{AVE}(n-1) - N_{IDL}\} \quad (1)$$

where $N_{AVE}(n-1)$ is the preceding average number of rpm; and K is an averaging constant.

Subsequently, the ignition timing controller 111 makes a comparsion between the average number of rpm ($N_{ave}(n)$) thus calculated and a target number of rpm ($N_{TID}$) so as to obtain a deviation therebetween, and calculates a quantity of ignition timing modification ($\theta_{ISC}$) based on the following formula:

$$\theta_{ISC} = (N_{TID} - N_{AVE}(n)) * K_1\theta \quad (2)$$

where $K_1\theta$ is a conversion constant.

Figure 6:
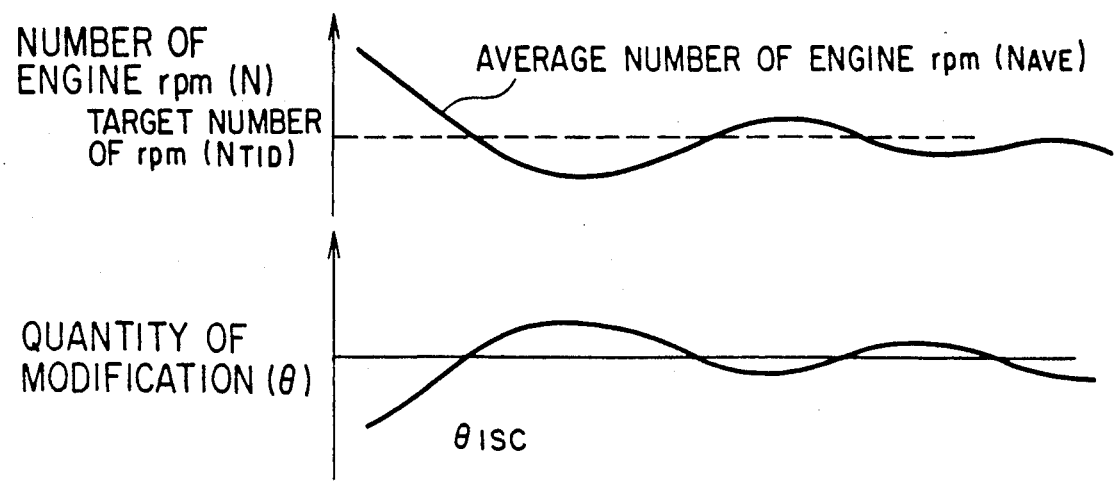
FIG. 6 is a graphic representative showing the rotation characteristic and the control characteristic of an engine controlled by the engine control device of FIG. 5.

The ignition timing controller 111 then controls ignition timing in such a manner that the predetermined ignition timing is modified by the quantity of ignition timing modification ($\theta_{ISC}$) thus calculated, thereby causing the number of rpm to become the target number of rpm ($N_{TID}$). From formula (2) above, it will be seen that the ignition timing is modified in the ignition-advancing direction when the average number of rpm($N_{AVE}(n)$) of the engine is less than the target number of rpm ($N_{TID}$) whereas the ignition timing is modified in the ignition-retarding direction when the average number of rpm ($N_{AVE}(n)$) is greater than the target number of rpm($N_{TID}$). This relation is clearly shown in FIG. 6.

In this regard, ignition timing control may also be effected using a quantity of ignition timing modification ($\theta_{ISC}(n)$) which is calculated from the following formula by integrating a difference between the target number of rpm ($N_{TID}$) and the instant or present average number of rpm ($N_{AVE}(n)$) in a successive manner:

$$\theta_{ISC}(n) = \theta_{ISC}(n-1) + (N_{TID} - N_{AVE}(n)) * K_2\theta \quad (3)$$

where $\theta_{ISC}(n-1)$ is the preceding quantity of ignition timing modification; and $K_2\theta$ is a conversion constant.

In this case, the quantity of ignition timing modification ($\theta_{ISC}(n)$) thus obtained is compared with a predetermined maximum value of ignition timing modification, and if the former is greater than the latter, the quantity of ignition timing modification ($\theta_{ISC}(n)$) is fixed to the maximum value.

As will be apparent from the above, according to the above embodiment, the present average number of engine rpm ($N_{AVE}(n)$) is calculated taking account of a change between the present number of engine rpm and the preceding one. Using the present average number of engine rpm thus calculated, it is possible to determine a deviation between the target idling number of rpm and the present number of rpm as presently sensed and calculated in a precise manner. As a result, the number of engine rpm can be exactly controlled to be at the target number of rpm based on the precisely determined and updated deviation.

Figure 7:
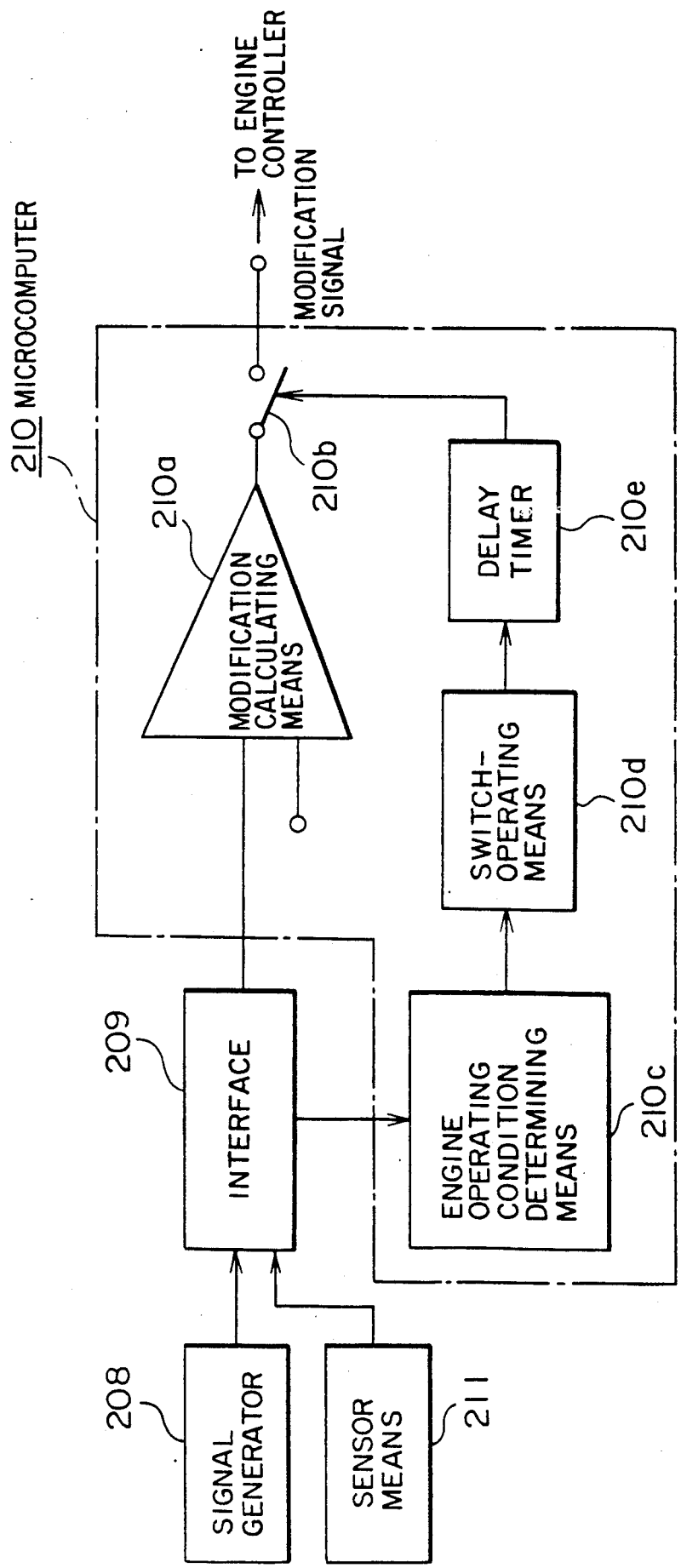
FIG. 7 is a view similar to FIG. 5 but showing another embodiment of the present invention.

FIG. 7 shows another embodiment of the present invention. In this embodiment, the engine control device illustrated includes a signal generator 208, an interface 209, a microcomputer 210 and sensor means 211 for sensig various operating conditions of an engine. The signal generator 208 and the interface 209 are the same as those indicated by respective reference numerals 108 and 109 of FIG. 5.

The microcomputer 210 comprises a control means in the form of a modification calculating means 210a which has a first input terminal connected to receive the output signal from the signal generator 208 via the interface 209, a second input terminal onto which a reference signal indicative of a target idling number of rpm is imposed, and an output terminal connected through an on-off switch 210b to an engine controller (not shown) such as an ignition circuit (not shown) which controls the engine operation so as to maintain the number of rpm at the prescribed target idling number of rpm, an engine condition determining means 210c connected to receive the output signals from the sensor means 211 via the interface 209 for determining the operating conditions of the engine and generating an output signal(s) representative of the sensed engine operating conditions, a switch-operating means 210d for opening and closing the switch 210b based on the output signal of the engine condition determining means 210c, and a delay timer 210e interposed between the switch-operating means 210d and the switch 210b for delaying the switching operation of the switch 210b a prescribed time after the switch 210b has been turned on by the switch-operating means 210d. The modification calculating means 210a operates to successively calculate an instant or present number of rpm of the engine from the output signal of the signal generator 208, for example, in the same manner as in the previous embodiment of FIG. 5, and compare it with the target idling number of rpm inputted to the second input terminal thereof so that it sends an output signal to the unillustrated engine controller for controlling the number of rpm of the engine to be at the target idling number of rpm when the engine is idling, i.e., when the number of rpm falls within a prescribed idle control range.

Figure 8:
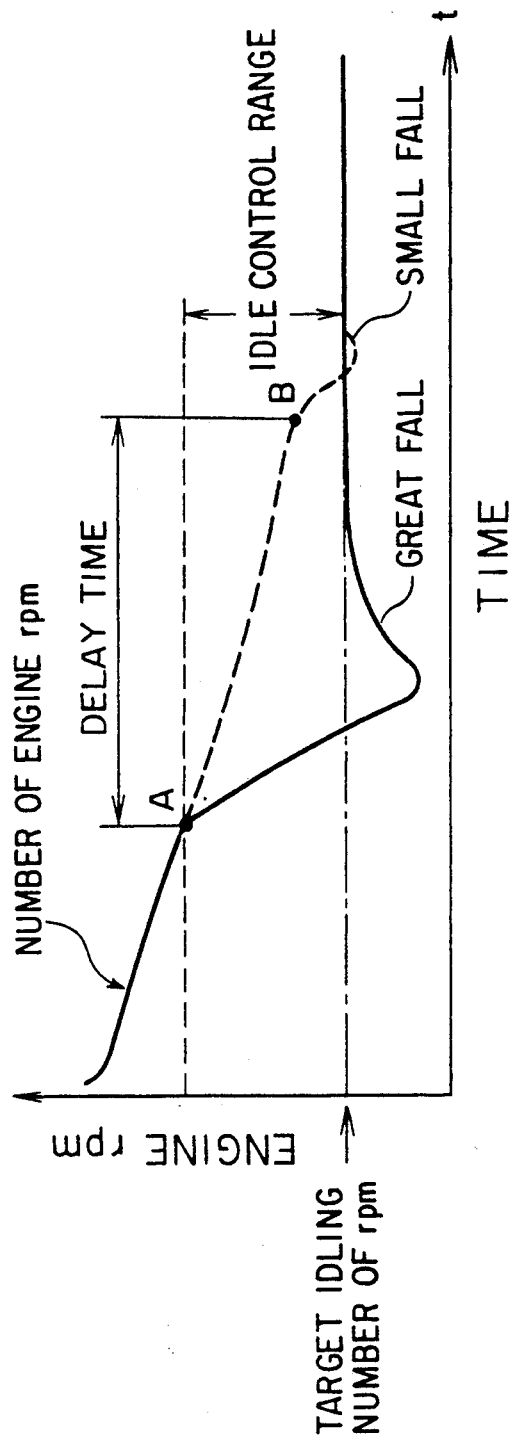
FIG. 8 is a view showing the condition of the engine controlled in a deceleration sense by the engine control device of FIG. 7.

In operation, the output signal of the signal generator 209, as shown in FIG. 3, is inputted via the interface 209 to the modification calculating means 210a where the present number of engine rpm is calculated from the signal generator output as described above. The modification calculating means 210a then determines whether the number of engine rpm thus calculated falls within a prescribed idle control range (which is, for example, from the prescribed target idling number of rpm to a certain number of rpm greater than that as illustrated in FIG. 8), and generates an output signal for approximating the number of rpm to the target value if it is determined that the number of rpm falls within the prescribed idle control range. In this regard, however, the modification calculating means 210a may comprise, similar to the previous embodiment of FIG. 5, a rotational number determining means for receiving the output signal of the signal generator 208 and determining a present number of engine rpm based on the signal generator output in a successive manner, and an ignition timing controlling means for controlling ignition timing in dependence upon various operating conditions of the engine, the ignition timing controlling means being operable to calculate a present average number of engine rpm which is updated every ignition instant, determine a deviation of the present average number of engine rpm from the target idling number of rpm, and modify the ignition timing based on the deviation thus determined in such a manner as to maintain the number of engine rpm at the target idle number of rpm.

On the other hand, the output signals of the sensor means 211 representive of the various engine operating conditions are inputted via the interface 209 to the engine condition determining means 210c which determines, based on the output signals of the sensor means 211, whether or not the operating condition of the engine is transient, e.g., the engine is decelerated with a clutch disengaged. If it is determined that the operating condition of the engine is transient, then the engine condition determining means 210c generates an output signal based on which the switch-operating means 210d sends a switch-closing signal to the switch 210b via the delay timer 210e whereby the switch 210b is closed in a prescribed delay time after the switch-operating means 210d has generated the switch-closing signal under the action of the delay timer 210e. In this manner, the output signal of the modification calculating means 210a is transmitted via the now closed switch 210b to the unillustrated engine controller in a delayed fashion so that the number of engine rpm is controlled to be at the target number of rpm by means of the engine controller.

In this connection, as clearly shown in FIG. 8, with the previously described known engine control device the idling stabilizing operation of the modification calculating means 210a commences at point A at which the decreasing number of engine rpm crosses the upper limit or maximum level of the idle control range, i.e., as soon as the number of engine rpm gets into the idle control range. This results in an excessive fall or decrease below the target idling level in the number of engine rpm, as clearly indicated by a solid line in FIG. 8. This is because at point A, a deviation between the present number of engine rpm and target idling number of rpm is the gratest in the idle control range so that an accordingly large quantity of modification (e.g., ignition timing modification) is required for approximating the number of engine rpm to the target idling value. In contrast, according to the present invention, the starting point at which the number of engine rpm is controlled to approach the target idling number of rpm is delayed a prescribed time from point A by means of the delay timer 210e, that is, such a decrease in the number of engine rpm begins at point B (i.e., after the prescribed time from point A), at which the number of rpm has decreased to a value near the target idling number of rpm. For this reason, a deviation between the present number of rpm and the target idling number of rpm is relatively limited, i.e., far smaller than the deviation at point A, thus resulting in a relatively limited quantity of modification (e.g., ignition timing modification) required, as clearly indicated by broken line in FIG. 8. Accordingly, an excessive fall or overshooting in the number of engine rpm below the target idling number or rpm can be effectively avoided, stabilizing the idling operation of the engine.

What is claimed is:

1. An engine control device for controlling the number of revolutions per minute of an engine to be at a prescribed target value during the idling operation thereof, said engine control device comprising:

a signal generator for generating an output signal representative of the crank angle of the engine in synchrony with the rotation thereof;

rotational number determining means for receiving the output signal of said signal generator and determining the number of revolutions per minute of the engine based on the signal generator output in a successive manner; and ignition timing controlling means for controlling ignition timing in dependence upon various operating conditions of the engine, said ignition timing controlling means being operable to calculate a present average number of revolutions per minute of the engine which is updated every ignition instant, determine a deviation of the present average number of revolutions per minute of the engine from the predetermined target value and modify the ignition timing based on the deviation thus determined in such a manner as to maintain the number of engine rpm at the target value, wherein said ignition timing controlling means calculates the present average number of revolutions per minute of the engine ($N_{AVE}(n)$) based on the preceding average number of revolutions per minute ($N_{AVE}(n-1)$) and the present number of revolutions per minute ($N_{IDL}$) by the use of the following formula:

$$N_{AVE} = (N_{AVE}(n-1) + K\{N_{AVE}(N-1) - N_{IDL}\}$$

where K is an averaging constant.

2. The engine control device according to claim 1, wherein said ignition timing controlling means modifies the ignition timing by a quantity of ignition timing modification ($\theta_{ISC}$) which is calculated based on the deviation of the present average number of revolutions per minute of the engine ($N_{AVE}(n)$) from the target number of revolutions per minute ($N_{TID}$) by the use of the following formula:

$$\theta_{ISC} = (N_{TID} - N_{AVE}(n)) * K_1\theta$$

where $K_1\theta$ is a conversion constant.

3. The engine control device according to claim 1, wherein said ignition timing controlling means modifies the ignition timing by a present quantity of ignition timing modification ($\theta_{ISC}(n)$) which is calculated based on the preceding quantity of ignition timing modification ($\theta_{ISC}(n-1)$), and the deviation of the present average number of revolutions per minute of the engine ($N_{AVE}(n)$) from the target number of revolutions per minute ($N_{TID}$) by the use of the following formula:

$$\theta_{ISC}(n) = \theta_{ISC}(n-1) + (N_{TID} - N_{AVE}(n)) * K_2\theta$$

where $K_2\theta$ is a conversion constant.

4. The engine control device according to claim 2 or 3, wherein said ignition timing controlling device presets a maximum quantity of ignition timing modification and fixes the present quantity of ignition timing modification ($\theta_{ISC}(n)$) at the maximum quantity of ignition timing modification.

5. The engine control device according to claim 1, wherein said rotational number determining means and said ignition timing controlling means are constituted by a microcomputer.

6. An engine control device for controlling the number of revolutions per minute of an engine to be at a prescribed target value during the idling operation thereof, said engine control device comprising:
   a signal generator for generating an output signal representative of the crank angle of the engine in synchrony with the rotation thereof;
   sensor means for sensing operating conditions of the engine and generating output signals representative of the sensed operating conditions;
   engine operating condition determining means for determining from the output signals of said sensor whether the engine is idling;
   control means for controlling the number of revolutions per minute of the engine to be at the prescribed target value during the time when the engine is idling; and
   delay means for delaying the controlling operation of said control means a predetermined time after said engine operating condition determining means has determined that the engine is idling,
   wherein said control means calculates the number of revolutions per minute of the engine based on the output signal of said signal generator, and determines whether the number of revolutions per minute of the engine falls within a prescribed idle control range, and approximates the number of revolutions per minute of the engine to the target value when it is determined that the number of revolutions per minute of the engine calculated falls within the prescribed idle control range.

7. The engine control device according to claim 6, wherein said prescribed idle control range is from the target value to a certain value greater than the target value.

8. The engine control device according to claim 6, wherein said engine operating condition determining means, said control means and said delay means are constituted by a microcomputer.

9. The engine control device according to claim 6, wherein said control means comprises:
   rotational number determining means for receiving the output signal of said signal generator and determining the number of revolutions per minute of the engine based on the signal generator output in a successive manner; and
   ignition timing controlling means for controlling ignition timing in dependence upon various operating conditions of the engine, said ignition timing controlling means being operable to calculate a present average number of revolutions per minute of the engine which is updated every ignition instant, determine a deviation of the present average number of revolutions per minute of the engine from the predetermined target value and modify the ignition based on the deviation thus determined in such a manner as to maintain the number of engine rpm at the target value.

* * * * *